March 14, 1939.    G. D. HAUSER    2,150,682
CASING FOR FURNACES AND THE LIKE
Filed April 28, 1937    2 Sheets-Sheet 1
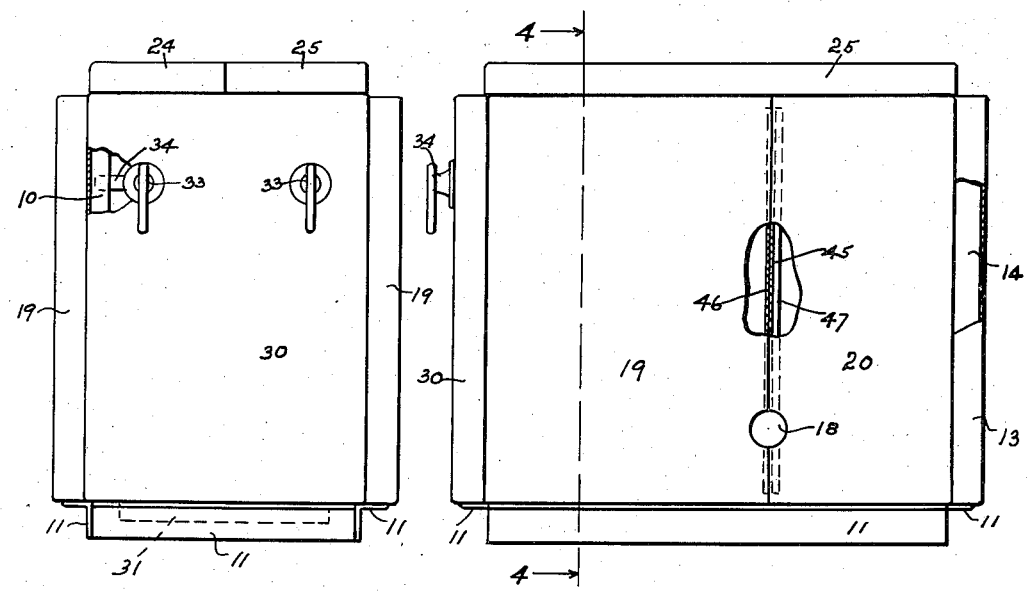
Fig 1    Fig 2
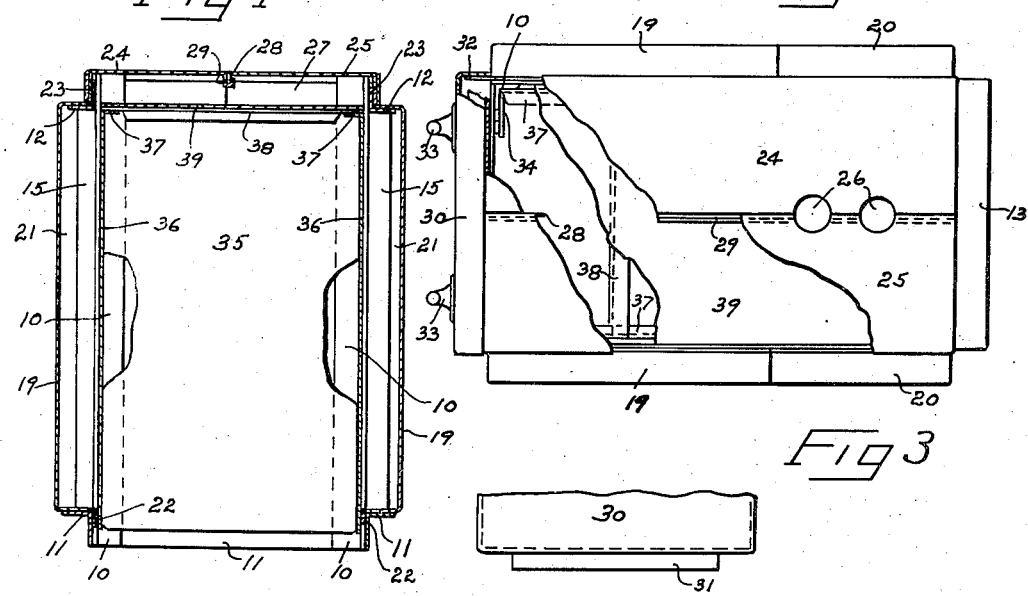
Fig 4    Fig 3
Fig 5
INVENTOR.
George D. Hauser,
BY
ATTORNEY.

March 14, 1939.  G. D. HAUSER  2,150,682
CASING FOR FURNACES AND THE LIKE
Filed April 28, 1937  2 Sheets-Sheet 2
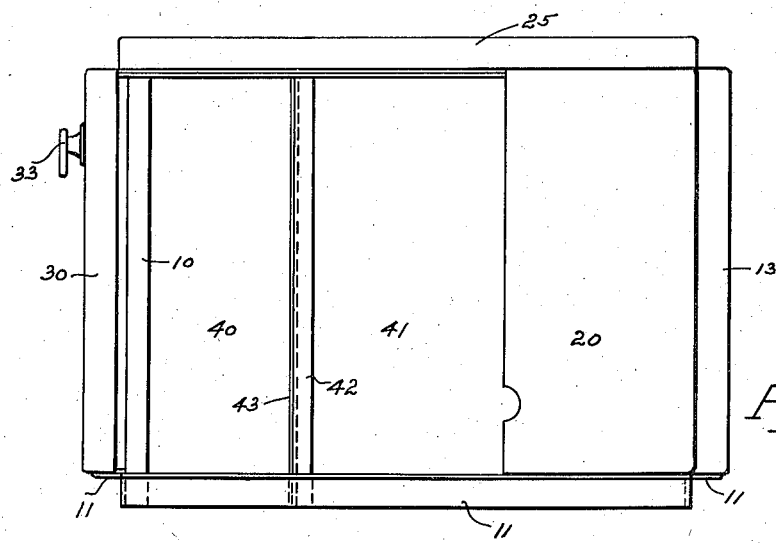
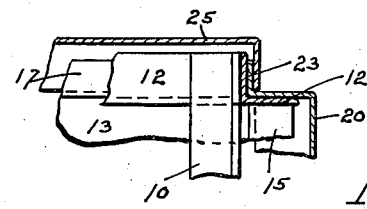
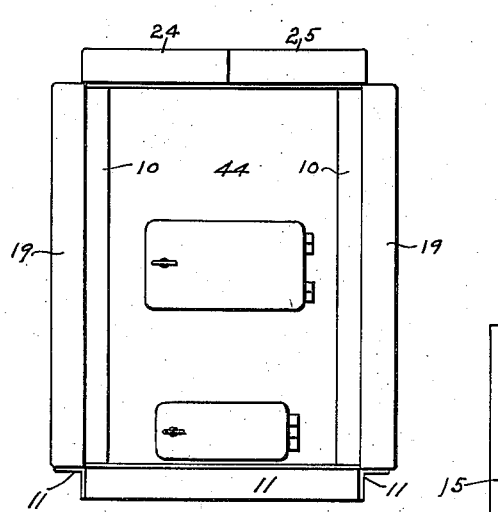
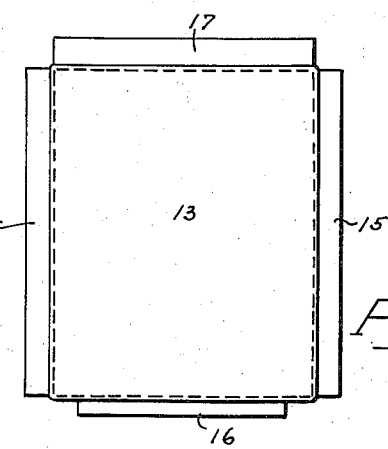
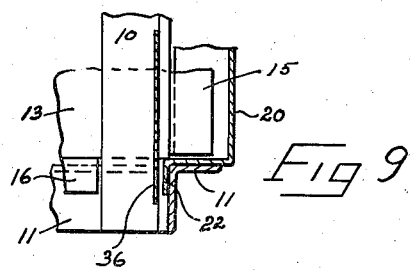
INVENTOR.
George D. Hauser,
BY Henrik J. Schmidt
ATTORNEY.

Patented Mar. 14, 1939

2,150,682

UNITED STATES PATENT OFFICE 2,150,682

CASING FOR FURNACES AND THE LIKE

George D. Hauser, Utica, N. Y., assignor to Utica Products Incorporated, Utica, N. Y., a corporation of New York Application April 28, 1937, Serial No. 139,474

4 Claims. (Cl. 220—9)

The invention relates to casings for boilers, heaters, furnaces and the like and has for one of its main objects to provide a casing which will greatly increase the insulating efficiency of such casings. Another object is to provide a casing which may readily be assembled around the furnace, even in quite inaccessible places, and which can be assembled with a minimum expenditure of time and labor and without any special tools or equipment.

A further object is to provide a casing of this type which will occupy but small space in shipping. A still further object is to provide a casing which may be used with furnaces and heaters of various types, whether used with coal, gas or oil as the fuel. A still further object is to so construct the casing that it may readily be dismounted so as to give access to the furnace for repairing or cleaning.

Additional objects are to provide a casing of simple construction which, when assembled, will form a strong and rugged unit; which will be neat in appearance; which will give easy access to the furnace, when this has to be attended to; and which can be manufactured and installed at a relatively low cost.

These and various other objects and advantages will be readily understood from the following description and from the accompanying drawings of preferred embodiments of the invention, in which, however, modifications may be made without departing from the scope of the appended claims. In the drawings, Fig. 1 is a front elevation of a casing made in accordance with the invention;

Fig. 2 is a side elevation shown with certain parts broken away;

Fig. 3 is a top view, similarly shown with parts broken away;

Fig. 4 is a cross-sectional, front view taken on the line 4—4 in Fig. 2;

Fig. 5 is a fragmental, front view showing the lower part of the door of the casing;

Fig. 6 is a side elevation of a slightly modified casing with certain panels removed;

Fig. 7 is a front view showing a different use of the casing;

Figs. 8 and 9 are fragmental views showing certain details of construction; and

Fig. 10 is a rear view of the rear panels.

Referring now to the drawings, the casing consists of a frame structure comprising four vertical, angle-iron, corner posts 10 which are held together at the bottom by four angle-iron members 11 and at the top by four angle-iron members 12. These angle-iron members are arranged as plainly shown in Fig. 4 and are preferably bolted together to facilitate assembling and disassembling the frame, but they may, of course, be riveted, welded or otherwise suitably assembled. On this rectangular frame structure the various panels, which make up the casing, are supported.

After the frame structure has been assembled around the furnace, the rear panel 13 is mounted on the frame. This panel, which is plainly shown in Figs. 2 and 10, is preferably made of sheet metal. The edges of the panel are bent so as to form a hollow chamber 14 and the extreme edges are bent to form two side flanges 15, a lower flange 16, and an upper flange 17. The ends of the lower flange are cut away so that the flange will enter between the vertical corner posts 10. As shown in Fig. 9, the flange 16 is inserted behind the lower angle-iron member 11 on the rear of the frame structure and, as shown in Fig. 8, the upper flange 17 is brought over the upper angle-iron member 12.

The side panels are next mounted on the frame structure. While these side panels may be made in a single piece for each side of the casing, I preferably make them in sections so that such openings as may be required, as for example the opening 18 shown in the side panels 19 and 20 in Fig. 1, may be placed directly in the joint between the two panels. Each of the side panels is constructed similarly to the rear panel just described so that air spaces 21 are formed. They are also each provided with a lower flange 22 and an upper flange 23. The lower flanges 22 are inserted behind the lower angle-iron member 11 and the upper flanges against the upper angle-iron members 12. The flanges 15 of the rear panel are held within the side panels 20, as plainly shown in Fig. 1.

The top cover is preferably made of two panels 24 and 25 so that any openings, such as the openings 26 which are required in the casing, may be located right in the joint between the two panels. These panels are constructed similar to the rear panels so as to provide an air space 27 but have no flange. One of the top panels, as for example 25, is provided with a downwardly extending edge 28, as plainly shown in Figs. 3 and 4, while the edge of the other panel is provided with a U-shape channel 29 in which the edge 28 locks, thus making the cover like one rigid member. The downwardly-extending edges of the cover fit over the upper flanges of the side and rear panels and thus effectively lock them to the frame structure.

The door 30 is constructed similarly to the other panels, but has only one flange 31 which extends downwardly at its lower end and is placed behind the lower angle-iron member 11. As the door is closed the edges of the door engage the side flanges 32 on the side panels 19. The door is preferably provided with two locks 33, each of which is provided with a latch 34 which engages behind the vertical frame post 10, as plainly shown in Fig. 1. It will thus be seen that the top panel locks all the other panels securely to the structure and that when the door is closed an air chamber is formed in the door similar to the air chambers formed in the panels.

Before the various panels are mounted on the frame, a sheet metal plate 35, preferably made of galvanized iron, is secured on the inner side of the rear members of the upright corner posts. Similar plates are secured on the inner sides of the sides of the frame work, as shown at 36. The inner side plates 36 have flanges 37 formed at the upper ends, as plainly shown in Fig. 4. On these flanges a plurality of light, supporting members 38 are located and on these supporting members an inner top plate 39 is placed. A similar inner plate may be placed in the door. Thus air spaces are formed between all the inner plates and the panels and, as no air can circulate through these spaces, the dead air contained in them acts as an excellent insulating medium.

The embodiment of the casing so far described is particularly well suited for the ordinary furnace. In oil fired furnaces I prefer to use the embodiment shown in Fig. 6. This is similar to the embodiment just described in all respects, except that the casing is divided into a front compartment 40 and a rear compartment 41. The furnace itself is contained in the compartment 41 while the oil burner and its accessories are contained in the compartment 40. The division between the two compartments is made by erecting an angle-iron member 42 on each side of the regular frame structure and by securing a sheet of galvanized iron 43 to these angle-iron members, as shown. In this embodiment the inner side plates may be omitted in the compartment 40, as this compartment in itself acts as a "dead" air space.

The casing shown in Fig. 7 is identical in all details with the casing shown in Figs. 1 and 2, except that in this instance the door is omitted and the front part of the furnace 44 is extended through the space in the front of the casing.

While the side panels, as well as the rear panels, may be made in a single piece, I preferably make them in standard widths so that the casing can be built up by using a certain number of panels. Where several panels are used the edges of adjoining panels are preferably constructed as shown in Fig. 1. In this instance the edge 45 of the panel 20 is bent inwardly, as is also the edge 46 of the panel 19, but, in addition, the extreme edge of the panel 19 is built sidewardly, as shown at 47, so as to effectively close the opening between the panels and prevent circulation of air through this opening.

While I have shown and described specific embodiments of this invention, it is evident that the casing might be varied in many details without departing from the scope of the claims.

Having described the invention and its objects, what I claim as new and wish to protect by Letters Patent is:—

1. A furnace of the class described comprising a frame structure made up of twelve angle-irons each one having outside flanges extending at right angles to each other and to the frame; a plurality of panels suspended on the sides, rear and top of said frame structure, said panels having inwardly extending flanges adapted to lie over the flanges of the frame structure; a partition formed in the casing for dividing it into two separate compartments; metal sheeting secured on the inner side of the frame structure in one of said compartments so as to form "dead air" spaces in all of the panels surrounding said compartment; and a door secured to the front end of the other compartment.

2. A six-sided geometrical rectangular frame structure formed of angle-irons tied together at their ends, and all of the flanges of the angles projecting outside at right angles; metal sheeting secured on the inner side of the frame structure; a plurality of side and rear panels each provided with top and bottom flanges; the said bottom flanges adapted to be engaged behind the lower spacing members of the frame structure; a cover having downwardly-extending edges; the upper flanges of all the panels locked under the edges of the cover to firmly secure the panels to the frame structure; and the cover and all of the panels being so shaped that they form "dead air" spaces around the casing.

3. A six-sided geometrical rectangular frame structure formed of angle-irons detachably tied together at their ends, and all of the flanges of the angles projecting outside at right angles; metal sheeting secured on the inner side of the frame structure; a plurality of side and rear panels each provided with top and bottom flanges; the said bottom flanges adapted to be engaged behind the lower spacing members of the frame structure; a cover having downwardly-extending edges; the upper flanges of all the panels locked under the edges of the cover to firmly secure the panels to the frame structure; and the cover and all of the panels being so shaped that they form "dead air" spaces around the casing.

4. A six-sided geometrical rectangular frame structure formed of angle-irons tied together at their ends by means of bolts, and all of the flanges of the angles projecting outside at right angles whereby the unit is easily taken apart; metal sheeting secured on the inner side of the frame structure; a plurality of side and rear panels each provided with top and bottom flanges; the said bottom flanges adapted to be engaged behind the lower spacing members of the frame structure; a cover having downwardly-extending edges; the upper flanges of all the panels lockable under the edges of the cover to firmly secure the panels to the frame structure; the cover and all of the panels being so shaped that they form "dead air" spaces around the casing; and said covers and panels made up in standard, interchangeable sections and provided with interlocking means for holding adjacent sections together and to prevent passage of air between such sections.

GEORGE D. HAUSER.